June 26, 1928.

W. P. LAKE 1,675,113

OVERCOAT OR THE LIKE

Filed March 14, 1927

INVENTOR.
William P. Lake
BY
ATTORNEY

Patented June 26, 1928.

1,675,113

UNITED STATES PATENT OFFICE.

WILLIAM P. LAKE, OF DAYTON, OHIO.

OVERCOAT OR THE LIKE.

Application filed March 14, 1927. Serial No. 175,041.

This invention relates to improvements in overcoats, or the like.

In the accompanying drawings which serve for illustrating the invention:

The objects attained in the invention consist in an overcoat designed more especially for the driver of a motor vehicle, which will be more adaptable and afford more comfort to the driver as he is seated at the steering wheel of the vehicle, and which will meet the requirements, as well, of a dress coat.

The overcoat, as here shown, is especially adaptable for the convenience and comfort of open motor vehicles, as trucks and service cars, in which the drivers are more or less exposed to the weather, and are required to get in and out of the vehicle frequently.

The novel features of the coat consist in making the skirt closed across the front and back, the front skirt 1 serving to cover the lap of the driver as he is seated in the vehicle, the rear skirt 2 also being more effective for covering than the common type of overcoat which has a vent in the back.

Figure 1:
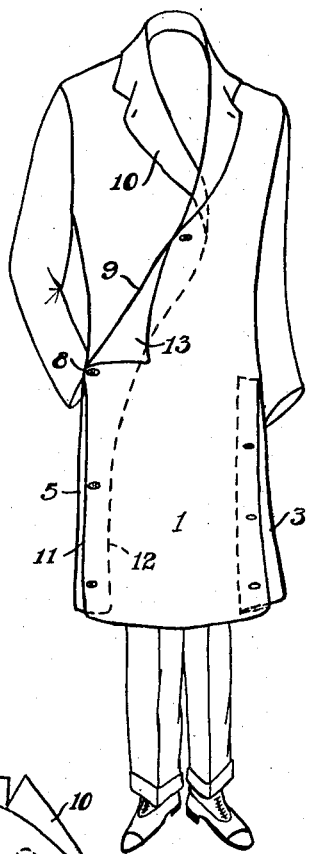
Fig. 1 is a view of the overcoat as worn.
Figure 2:
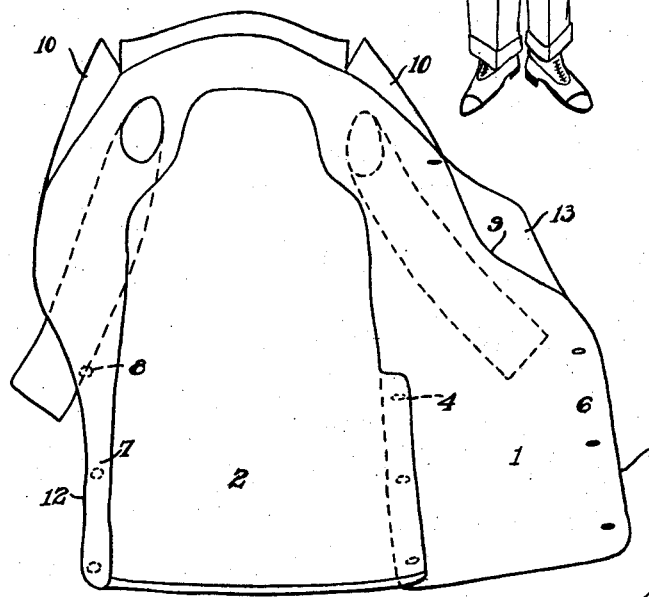
Fig. 2 is a view of the coat removed and spread open.

The skirt of the coat, as shown in Figs. 1-2, is provided with a vent 3 at one side, closed by suitable fasteners 4, the coat being open as indicated at 5 on the opposite side, the edges of the coat overlapping as indicated at 6—7, the outer overlap 6 being directed rearward and buttoned or closed by suitable fasteners 8.

The upper portion of the coat is shaped diagonally across the front, as indicated at 9, from the intersection of the lapels 10 to a point at the side indicated by one of the fasteners 8 from which the opening is directed downward to the lower edge of the skirt. The opposite edges of the coat are cut on curves 11—12, the curve of one edge being inverse to the curve of the other edge for closing the coat across the front substantially on an extension of the curve of the opposite side of the collar line effecting equalization of the overlapping portions 6—7.

As shown in Fig. 1, the front of the coat when the same is to be made for a dress coat, may be provided along the diagonal edge 9 with a lapel 13 for finishing the edge, the effect being made to harmonize with the upper lapels 10.

Figure 4:
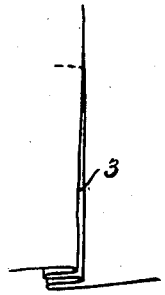
Fig. 4 is a view of a modified vent.
Figure 3:
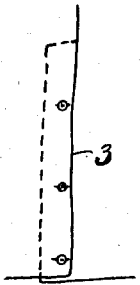
Fig. 3 is a view of a side vent.

The vent illustrated in detail Fig. 3 is the usual form of buttoned vent except that in the overcoat as here shown it is placed at the side. The modified vent illustrated in Fig. 4 is provided with an inner fold of material, or a pleat, for closing the vent and for giving roominess to the skirt without added fullness in the front or back portions. The skirt may also be made without the side vent by providing the necessary fullness required for freedom in walking, etc.

It is obvious that suitable modifications can be made in the design of the overcoat without departing from the general arrangements of the features of the invention.

Having described my invention, I claim:

1. An overcoat open across the front downward to a point at the side near the upper portion of the skirt, and thence downward to the lower edge of the skirt, and a vent in the opposite side of the skirt.

2. An overcoat open across the front downward to a point at the side, thence downward to the lower edge of the skirt, and a pleated vent in the opposite side of the skirt for effecting roominess thereof.

3. An overcoat open diagonally across the front downward to a point at the side near the upper portion of the skirt, thence downward to the lower edge of the skirt and an adjustable vent in the opposite side of the skirt.

4. An overcoat open across the front downward to a point at the side on an extension of the curve of the opposite side of the collar line, thence downward to the lower edge of the skirt, the coacting edges of the coat being formed on curves inverse one to the other for effecting equally extended overlapping portions along the line of said opening.

5. An overcoat open across the front downward to a point at the side, thence downward to the lower edge of the skirt, the skirt being undivided at the front and rear, and a vent in the opposite side thereof.

6. An overcoat open across the front downward to a point at the side on an extension of the curve of the opposite side of the collar line, thence downward to the lower edge of the skirt, the coacting edges of the coat being formed on curves inverse one to the other for effecting equally extended overlapping portions along the line of said opening, and a plurality of lapels arranged on the outer overlapping portion.

In testimony whereof, I affix my signature.

WILLIAM P. LAKE.